United States Patent
Nakagawa et al.

(10) Patent No.: US 10,839,111 B2
(45) Date of Patent: Nov. 17, 2020

(54) ASSISTANCE METHOD

(71) Applicant: MISUMI CORPORATION, Tokyo (JP)

(72) Inventors: Rie Nakagawa, Tokyo (JP); Taketo Kudo, Tokyo (JP); Masatsugu Tsukamoto, Tokyo (JP)

(73) Assignee: Misumi Corporation, Tokyo (JP)

( * ) Notice: Subject to any disclaimer, the term of this patent is extended or adjusted under 35 U.S.C. 154(b) by 488 days.

(21) Appl. No.: 15/553,059

(22) PCT Filed: Dec. 28, 2015

(86) PCT No.: PCT/JP2015/086499
§ 371 (c)(1),
(2) Date: Aug. 23, 2017

(87) PCT Pub. No.: WO2016/139874
PCT Pub. Date: Sep. 9, 2016

(65) Prior Publication Data
US 2018/0032639 A1    Feb. 1, 2018

(30) Foreign Application Priority Data
Mar. 5, 2015   (JP) ................. 2015-043787

(51) Int. Cl.
*G06F 17/50*      (2006.01)
*G06F 30/00*      (2020.01)
(Continued)

(52) U.S. Cl.
CPC ......... *G06F 30/00* (2020.01); *G06Q 30/0603* (2013.01); *G06Q 50/04* (2013.01); *G06F 2111/20* (2020.01)

(58) Field of Classification Search
None
See application file for complete search history.

(56) References Cited

U.S. PATENT DOCUMENTS 5,617,528 A * 4/1997 Stechmann ............ G06K 1/121
                                                  358/540
7,143,341 B1 * 11/2006 Kohli ..................... G06F 30/00
                                                  715/234
(Continued)

FOREIGN PATENT DOCUMENTS

CN      1754170 A      3/2006
JP      H04-005766 A   1/1992
(Continued)

OTHER PUBLICATIONS

Extended European search report dated Jul. 16, 2018 issued in the corresponding EP patent application 15884040.5.
(Continued)

*Primary Examiner* — Rehana Perveen
*Assistant Examiner* — Cuong V Luu
(74) *Attorney, Agent, or Firm* — Carrier Blackman & Associates, P.C.; Joseph P. Carrier; Jeffrey T. Gedeon (57) ABSTRACT

A search is performed as to whether a modified component is stored in a standard component data memory unit in which data on a plurality of standard components each including at least dimensions that define the shape and a model number are prestored, and when it is found that the modified component is stored in the standard component data memory unit, the model number of the component before the modification is replaced with a model number related to the standard component.

16 Claims, 6 Drawing Sheets

(51) Int. Cl.
  *G06Q 50/04* (2012.01)
  *G06Q 30/06* (2012.01)
  *G06F 111/20* (2020.01)

(56) References Cited

U.S. PATENT DOCUMENTS

| | | | |
|---|---|---|---|
| 2002/0059049 A1* | 5/2002 | Bradbury | A61F 2/30942 703/11 |
| 2003/0061238 A1 | 3/2003 | Atkinson | |
| 2003/0220911 A1* | 11/2003 | Tompras | G06F 17/50 |
| 2004/0088283 A1* | 5/2004 | Lissar | G06F 16/288 |
| 2004/0138772 A1* | 7/2004 | Barman | G05B 19/4097 700/97 |
| 2005/0188348 A1* | 8/2005 | Han | G06T 19/00 717/105 |
| 2005/0203718 A1* | 9/2005 | Carek | G06F 17/50 703/1 |
| 2006/0041535 A1* | 2/2006 | Qamhiyah | G06F 17/50 |
| 2006/0155760 A1* | 7/2006 | Takahashi | G06F 17/50 |
| 2007/0216681 A1* | 9/2007 | Nishida | G06Q 10/00 345/427 |
| 2007/0262982 A1 | 11/2007 | Ninomiya | |
| 2008/0269942 A1* | 10/2008 | Free | G06F 17/50 700/182 |
| 2009/0060393 A1* | 3/2009 | Satoh | G06K 9/00476 382/305 |
| 2009/0259440 A1* | 10/2009 | Reed | G06F 17/50 703/1 |
| 2011/0098837 A1* | 4/2011 | Yucel | G06F 17/5086 700/104 |
| 2012/0143365 A1* | 6/2012 | McIver | G06Q 10/06 700/105 |
| 2015/0153724 A1* | 6/2015 | Platt | G02B 19/4097 705/26.5 |
| 2015/0199470 A1* | 7/2015 | Young | G06F 17/5095 700/98 |
| 2015/0339626 A1* | 11/2015 | Foster | G06F 17/50 705/29 |

FOREIGN PATENT DOCUMENTS

| | | |
|---|---|---|
| JP | 2003-308461 A | 10/2003 |
| JP | 2005-011224 A | 1/2005 |
| JP | 2008-250448 A | 10/2008 |
| JP | 2012-079094 A | 4/2012 |
| JP | 2012-108734 A | 6/2012 |
| WO | 2006/064971 A1 | 6/2006 |
| WO | 2014/065806 A1 | 5/2014 |

OTHER PUBLICATIONS

Office Action dated Aug. 24, 2018 issued in the corresponding Chinese patent application No. 201580077344.5 with the English translation thereof.

\* cited by examiner

| COMPONENT | BOLT (STANDARD) |
| MODEL NUMBER | BLAD10-5 |

DIMENSIONS IN SPECIFICATIONS

| TYPE | STANDARD |
| D TOLERANCE | g6 |
| MATERIAL | SUJ2 |
| HARDNESS | INDUCTION HARDENING |
| SURFACE TREATMENT | NONE |
| D | 10 mm |
| L | 5 mm |

ASSISTANCE METHOD

TECHNICAL FIELD

The present invention relates to a design assistance method configured to assist in designing a design product composed of a plurality of components.

BACKGROUND ART

Conventionally, various CAD applications have been proposed to assist a designer in designing. Among such CAD applications, there is an application capable of incorporating CAD data such as standard components in a catalog.

Further, Patent Literature 1 discloses an order reception system in which, when a designer changes the external dimensions of a processed component, the drawing is automatically modified and displayed on a worker's display so that a component manufacturer can receive an order for the component through the Internet network.

CITATION LIST

Patent Literature

Patent Literature 1: Japanese Patent Application Laid-Open No. 2012-79094

SUMMARY OF INVENTION

Technical Problem

However, the designer makes design changes on a CAD screen of a display, and when modifying a component, the designer takes no account of whether the modified component is a standard component, what is the model number, and the like on the spot.

Therefore, when the modified component is not a standard component, there is a possibility that the designer will be forced to make a design change again. There is also a possibility that the component manufacturer cannot receive an order for a component, for which the order is expected to be received as a standard component listed in a catalog at first, due to the design change of the component.

The present invention has been made in consideration of the above background, and it is an object thereof to provide a design assistance method capable of making a model number follow a modified component.

Solution to Problem

A method of the present invention is a method of causing a display device to display the shape of a component based on component data on a computer including the display device and an input device, including: an acceptance step of accepting an instruction to modify a component from the input device; a search step of searching for whether a modified component after the modification in accordance with the accepted instruction is stored in a standard component data memory unit in which data on a plurality of standard components each including at least dimensions that define the shape and a model number are prestored; a model number replacing step in which, when the modified component after the modification is searched in the search step to be stored in the standard component data memory unit, the model number of the component before the modification is replaced with the model number related to the standard component; and a redisplay step of displaying, on the display device, the shape of the component based on shape data of the modified component on which the instruction is accepted.

According to the method of the present invention, when the modified component is a standard component, the model number of the modified component is automatically replaced with a model number related to the standard component. Thus, a designer is not required to check whether the modified component is a standard component, and check on the model number and the like of the modified component, and this can simplify the design work. As for a component manufacturer, the risk of being unable to receive an order for a component, for which the order is expected to be received as a standard component listed in a catalog at first, due to the design change of the component can be reduced.

In the method of the present invention, it is preferred that the computer should include an alert device, and the method should further include an alert step of causing the alert device to issue a warning when the modified component is searched in the search step not to be stored in the standard component data memory unit.

In this case, a warning is issued when the modified component is not a standard component, and this can urge the designer to adopt a standard component which is generally inexpensive and the delivery date of which is earlier.

For example, in the method of the present invention, the instruction to modify the component includes an instruction to modify at least one of the dimensions that define shape data of the component.

Further, in the method of the present invention, it is preferred that a range of dimensions related to at least one of the dimensions that define shape data of the component should be included in the standard component data memory unit, and when a modified dimension of the component is searched in the search step to be out of the range of dimensions, the waring should be issued in the alert step, while when the modified dimension of the component is searched in the search step to be within the range of dimensions, the model number of the component before the modification should be replaced with a model number corresponding to the modified dimension in the model number replacing step.

In this case, when the modified dimension of the component is within a range of dimensions of a standard component, the model number of the modified component is automatically replaced with a model number related to the standard component. Thus, the designer is not required to check whether the modified component is a standard component, and check on the model number and the like of the modified component, and this can simplify the design work. Further, when the modified dimension of the component is out of the range of dimensions of the standard component, a warning is issued. This can make the designer become aware of the need to limit the dimensions of the component to the range of dimensions of the standard component.

For example, in the method of the present invention, the instruction to modify the component includes an instruction to modify shape data of the component.

Further, for example, in the method of the present invention, the instruction to modify the component includes an instruction to modify at least any one piece of data in the data on the component.

In the method of the present invention, it is preferred to further include a price calculation step of calculating a price of the modified component according to the length of the modified dimension when the modified dimension of the component is searched in the search step to be within the range of dimensions, and a price display step of causing the display device to display the price calculated in the price calculation step.

In this case, the price of the modified component can be presented automatically to the designer.

For example, in the method of the present invention, the data include the delivery date or the price of the component.

Further, for example, in the method of the present invention, the instruction to modify the component includes an instruction to modify the shape of at least one portion of the component.

Further, in the method of the present invention, it is preferred that data on a semi-standard component in which the shape of at least one portion of the component is modified should be prestored in the standard component data memory unit, and when the modified shape of the component after the modification is searched in the search step to match with that of the semi-standard component, the model number of the component before the modification should be replaced in the model number replacing step with a model number generated according to the semi-standard component after the modification.

In this case, when the shape of the modified component matches the shape of the standard component or the semi-standard component, the model number of the modified component is automatically replaced with the model number related to the standard component or the semi-standard component. Thus, the designer is not required to check whether the modified component is a standard component or a semi-standard component, and check on the model number and the like of the modified component, and this can simplify the design work. Further, when the dimensions of the modified component are neither those of the standard component or those of the semi-standard component, a warning is issued. This can make the designer become aware of the need to modify the shape of the component into the standard component or the semi-standard component.

Further, in the method of the present invention, it is preferred that, when the modified shape of the component after the modification is searched in the search step to match with that of the standard component, the model number of the component before the modification should be replaced in the model number replacing step with a model number related to the standard component after the modification.

In this case, when the shape of the modified component matches the shape of the standard component, the model number of the modified component is automatically replaced with the model number related to the standard component. Thus, the designer is not required to check whether the modified component is a standard component or a semi-standard component, and check on the model number and the like of the modified component, and this can simplify the design work.

In the method of the present invention, it is preferred to further include a list creation step of creating a list including at least the model number of the displayed component, wherein when the model number is replaced in the model number replacing step with the model number after the modification, a list in which the model number is replaced with the model number after the modification is created in the list creation step.

In this case, when the component is modified, a list in which the model number of the modified component is replaced can be automatically created.

In the method of the present invention, it is preferred to further include a file name changing step in which, when the model number of the component is replaced in the model number replacing step, a file name related to data including the shape data and model number of the component is changed.

In this case, when the component is modified, the file name related to the component is automatically changed, and this can prevent a confusion between file names before and after the modification.

For example, in the method of the present invention, the instruction to modify the component includes an instruction to change the model number.

Further, in the method of the present invention, it is preferred that data on basic dimensions that define dimensions of a basic shape of the standard component should be included in data on the standard component stored in the standard component data memory unit, and when the modified shape of the component is searched in the search step to match with that of the standard component, the standard component after the modification should be displayed in the redisplay step to match the basic dimensions of the standard component to the basic dimensions of the standard component before the modification.

In this case, the modified component can be placed in the position of the component before the modification.

In the method of the present invention, it is preferred to further include a related component changing step in which, when the instruction to modify the component is accepted from the input device in the acceptance step, shape data of the component is changed to shape data of another component related to the component on which the instruction to modify is accepted, wherein the shape based on the shape data of the component changed in the related component changing step is also redisplayed in the redisplay step.

In this case, when the component is modified, a component required to change in association therewith can be automatically changed.

A computer readable and executable program of the present invention is a program causing a computer including a display device and an input device to execute: an acceptance step of accepting an instruction to modify a component from the input device; a search step of searching for whether a modified component on which the instruction is accepted is stored in a standard component data memory unit in which data on a plurality of standard components each including at least dimensions that define the shape and a model number are prestored; a model number replacing step in which, when the modified component is searched in the search step to be stored in the standard component data memory unit, the model number of the component before the modification is replaced with the model number related to the standard component; and a redisplay step of displaying, on the display device, the shape of the component based on shape data of the modified component on which the instruction is accepted.

DESCRIPTION OF EMBODIMENT

A CAD system running on a computer 100 by a method according to an embodiment of the present invention will be described with reference to the accompanying drawings. A program according to the embodiment of the present invention is a program readable and executable by the computer 100 to run the CAD system on the computer 100.

The CAD system may be an add-on system in which a program having functions relating to the method of the present invention is added on a commercially available CAD system, or may be a system in which a program for the CAD system executes the functions of the method of the present invention.

The CAD system is configured by the computer 100. The computer 100 that configures the CAD system includes an input device 110 such as a keyboard and a mouse, a display device 120 such as a display, an output device 130 including a printing device such as a printer, a communication device 140 which transmits and receives information through a communication line such as LAN (Local Area Network), a memory device 150 composed of a semiconductor memory, a hard disk drive, and the like to store a program and data, a central processing unit (CPU) which executes the program stored in the memory device to control the input device 110, the display device 120, the output device 130, and the communication device 140, and an alert device 160 such as a speaker device.

The program stored in the memory device 150 is a program to control the CAD system, which may also include an OS (Operating System) and various application programs in addition to the program used to execute the method according to the embodiment of the present invention. The computer 100 may be a general computer, and the detailed description thereof will be omitted.

The program may be stored on a recording medium, or may be installed and stored in the memory device 150 of the computer 100 wirelessly or by wire. For example, the recording medium may be a recording medium fixedly carrying the program, including a tape recording medium like a magnetic tape or a cassette tape, a disk recording medium like a magnetic disk, such as a flexible disk or a hard disk, or an optical disk such as a CD-ROM (Compact Disk Read-Only Memory), an MO (Magnet Optical disk), an MD (Mini Disc), or a DVD (Digital Versatile Disk), a card type recording medium like an IC (Integrated Circuit) card (including a memory card) or an optical card, or a semiconductor memory such as a mask ROM, an EPROM (Erasable Programmable Read-Only Memory), an EEPROM (Electrically Erasable Programmable Read-Only Memory), or a flash ROM.

Figure 1:
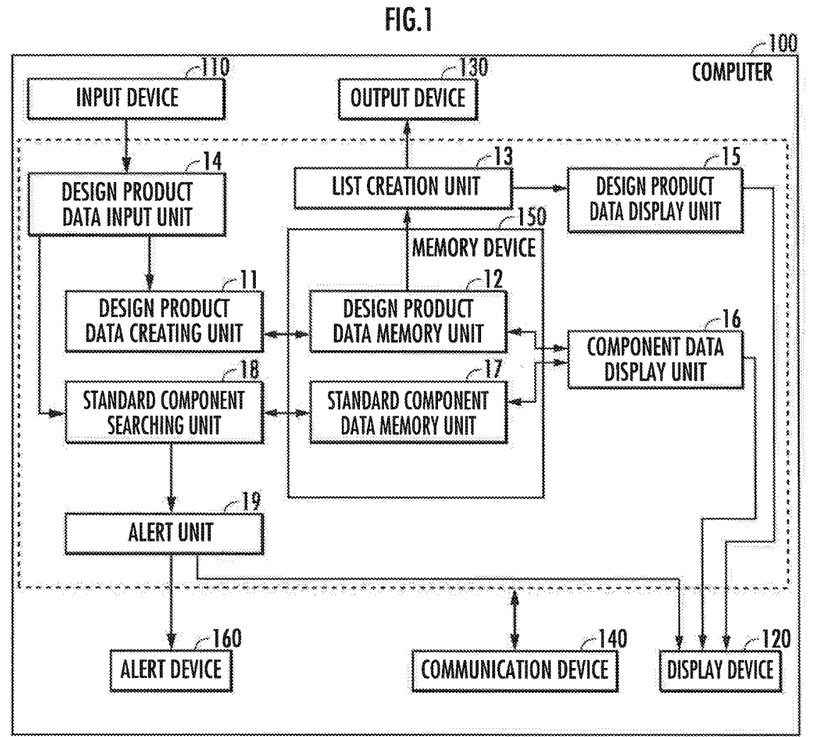
FIG. 1 is a block diagram of a CAD system running on a computer by a method according to an embodiment of the present invention.

As illustrated in FIG. 1, the CAD system is configured to include a design product data creating unit 11, a design product data memory unit 12, a list creation unit 13, a design product data input unit 14, a design product data display unit 15, a component data display unit 16, a standard component data memory unit (standard component database) 17, a standard component searching unit 18, and an alert unit 19.

The design product data creating unit 11, the list creation unit 13, the design product data input unit 14, the design product data display unit 15, the component data display unit 16, the standard component searching unit 18, and the alert unit 19 are functions implemented by the CPU executing the program stored in the memory device 150 of the computer 100 to control the CAD system. The design product data memory unit 12 and the standard component data memory unit 17 are included in the memory device 150 of the computer 100.

The design product data creating unit 11 creates design product data representing a design product designed using a CAD system such as a two-dimensional CAD (Computer Aided Design) system or a three-dimensional CAD system. The design product is composed of a plurality of components.

The design product data are data including data representing each of components that constitute the design product, including data such as design product data representing the design product, component data representing the components that constitute the design product, and positional data representing the position of each of the components.

The design product data include a file name of the design product data, the name and product number of the design product, the name of a designer, the creation date, and the version. The component data include a file name of the component data, the name of each component, the number of components, the model number, the name of a manufacturer, the dimensions, material, surface treatment, price, and delivery date of the component, and shape data on the component. The positional data include data indicative of the position of each component.

The design product data memory unit 12 stores design product data created by the design product data creating unit 11.

Figure 2:
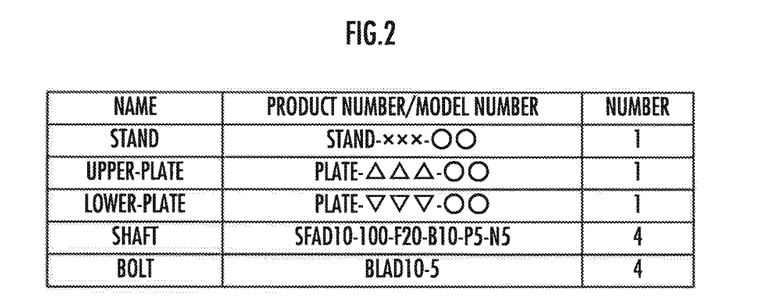
FIG. 2 is a table illustrating an example of a list.

The list creation unit 13 acquires design product data and component data recorded in the design product data memory unit 12 to create a list (component table) in which these pieces of data are hierarchically developed. As illustrated in FIG. 2, this list includes the name and product number of a design product, the name and model number of each component, and the number of components.

The list creation unit 13 may be implemented by a program incorporated in an existing CAD system to cause the computer 100 to execute the program. The format and display state of the list are optional. When receiving a request from a designer through the input device 110 such as the keyboard or the mouse, the list created by the list creation unit 13 is displayed on the display device 120 such as a display or printed out from the output device 130 such as a printer as needed.

The design product data input unit 14 accepts input such as change or addition of design product data through the input device 110 such as the keyboard or the mouse. The change or addition is a generally known CAD operation.

Since such the CAD operation varies depending on the CAD system, the detailed description thereof will be omitted here.

Figure 3:
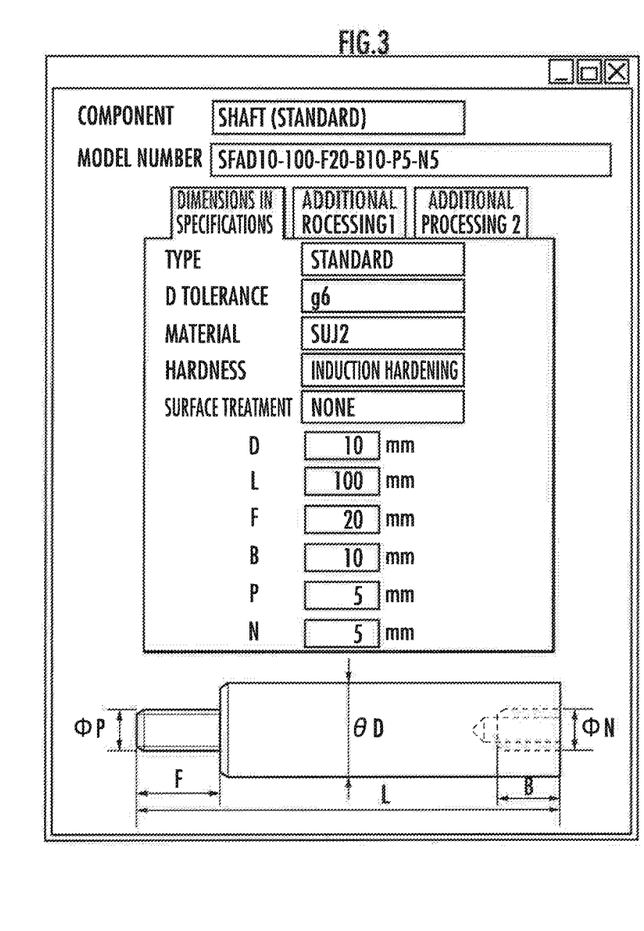
FIG. 3 is a diagram illustrating an example in which standard component data are displayed on a screen.

The design product data input unit 14 also accepts input of a modification to a component through the input device 110 such as the keyboard or the mouse, where the component is displayed on the display device 120 such as the display by the component data display unit 16. Referring to FIG. 3, the modification to the component is input in such a manner that, after using the mouse to move a pointer, displayed on the screen of the display device 120, into a shape field in which numerical values and the like of component data are displayed and clicking the left mouse button, a numerical value is entered through the keyboard or a button to increase or decrease the numerical value is clicked using the mouse.

Figure 4:
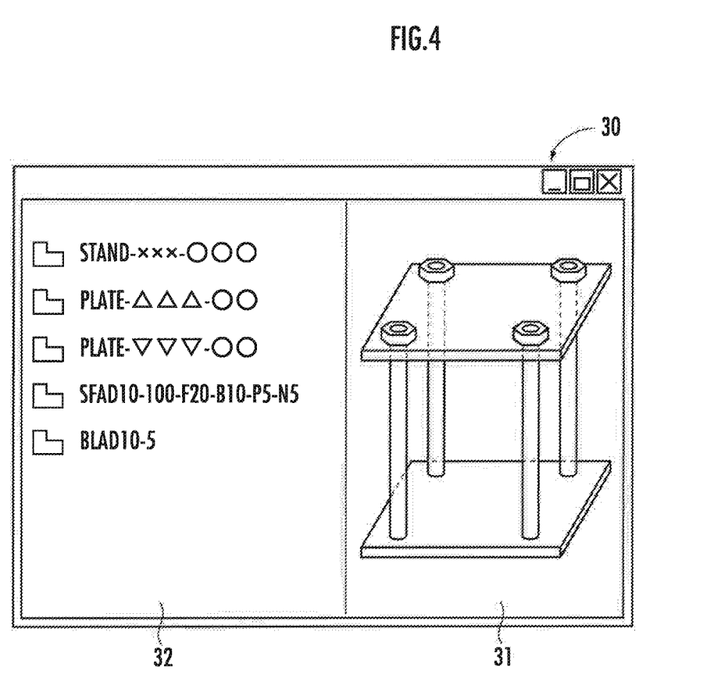
FIG. 4 is a diagram illustrating an example in which a design product and file names are displayed on the screen.

As illustrated in FIG. 4, the design product data display unit 15 displays, on the display or the like, an image of a design product represented by design product data stored in the design product data memory unit 12. In this case, all components included in the design product are displayed in a shape, represented by shape data included in component data on the components, and in positions represented by positional data.

As illustrated in FIG. 3, the component data display unit 16 displays, on the display device 120 such as the display, data on each component including data such as the dimensions and the material included in the component data, in addition to an image of the component represented by the component data stored in the design product data memory unit 12.

When the component data display unit 16 displays, on the display device 120, the data on the component, the design product data display unit 15 may cause the display device 120 to display the component in a state different from that of the other components. For example, the component may be displayed in a more eye-catching color than that of the other components, surrounded by a double border, or highlighted.

In the standard component data memory unit 17, data on the dimensions, materials, and the like of various standard components are stored. The components registered in the standard component data memory unit 17 are called standard components. The standard components also include semi-standard components whose model numbers are automatically determined based on the dimensions and the like. On the other hand, components other than standard components and semi-standard components, for which the model numbers are not automatically determined based on the dimensions and the like, are called non-standard components.

The semi-standard components mean components each having a model number, in which numerical values (for example, 200 corresponding to a shaft length of 200 mm), letters (for example, S corresponding to predetermined coating), and the like corresponding to a predetermined dimension (for example, shaft length L), material, surface processing, and the like are partially incorporated, but each of which is not set as a standard component. The semi-standard component is a component whose price can be calculated using, for example, a predefined calculation formula based on the above-mentioned, predetermined dimension and the like, and whose delivery date and the like are predetermined. The semi-standard component is generally more expensive and longer in delivery date than a similar standard component.

The non-standard components are components whose model numbers are indefinite and which require additional processing, additional surface treatment, and the like to be performed on a specialized product, a non-standard product, a specially processed product, a standard component, or a semi-standard component. The non-standard components are components whose prices, delivery dates, and the like need to be inquired from component manufacturers, and which are generally more expensive and longer in delivery date than similar standard components or semi-standard components.

FIG. 3 is a diagram illustrating an example in which a standard component registered in the standard component data memory unit 17 is displayed. Here, a "shaft (standard)" is exemplified as a standard component. Here, a model number, a material, surface treatment (surface finishing), a shaft diameter D, a shaft length L, a male screw length F, a female screw length B, a male screw diameter P, and a female screw diameter N are registered as parameters (registration items) of standard component data associated with the "shaft (standard)."

Figure 5:
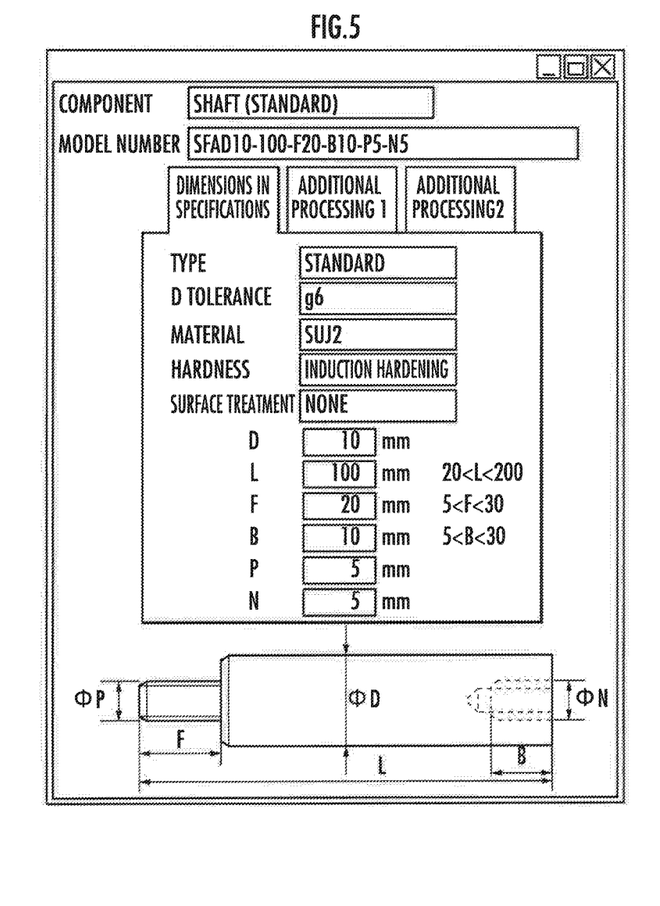
FIG. 5 is a diagram illustrating another example in which the standard component data are displayed on the screen.

FIG. 5 is a diagram illustrating an example in which a semi-standard component registered in the standard component data memory unit 17 is displayed. Here, the "shaft (standard)" is exemplified as the semi-standard component. Here, a model number determining formula, a material, surface treatment (surface finishing), a shaft diameter D, a range of the shaft length L, a ranged of the male screw length F, a range of the female screw length B, a male screw diameter P, and a female screw diameter N are registered as parameters of semi-standard component information associated with the "shaft (standard)."

Figure 6:
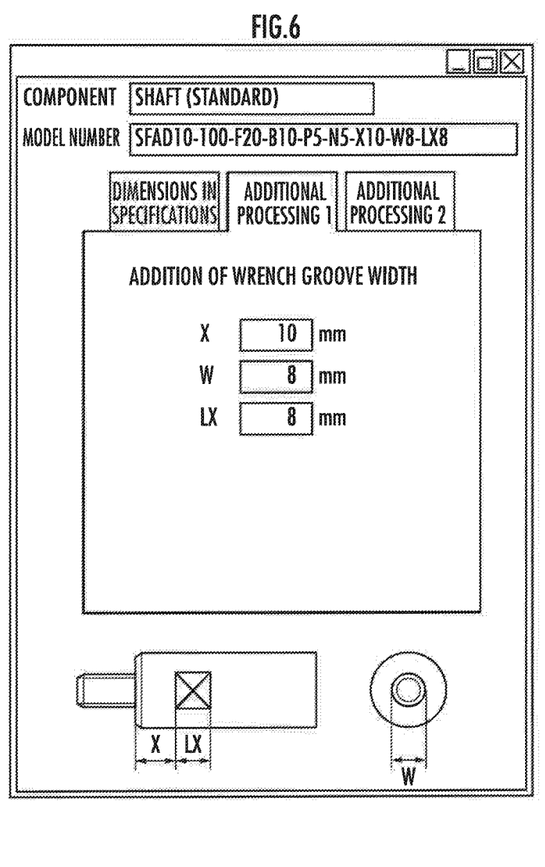
FIG. 6 is a diagram illustrating still another display example in which semi-standard component data are displayed on the screen.

FIG. 6 is a diagram illustrating another example in which a semi-standard component registered in the standard component data memory unit 17 is displayed. Here, an example of performing predetermined additional processing on the "shaft (standard)" as a semi-standard component is illustrated. Here, an additional processing position X, an additional processing length LX, and a wrench groove width W are registered as parameters of semi-standard component data associated with the "shaft (standard)."

When any of the material, the surface finishing, the shaft diameter D, the shaft length L, the male screw length F, the female screw length B, the male screw diameter P, the female screw diameter N, and the additional processing is not registered in standard component information or semi-standard component information, when the shaft length L of the semi-standard component is out of a setting range of the shaft length L, when the screw form of a male screw or a female screw is not a screw form defined for a standard component or a semi-standard component, and when additional processing other than the additional processing predefined for the standard component or the semi-standard component is required, the component is a non-standard component.

Figure 7:
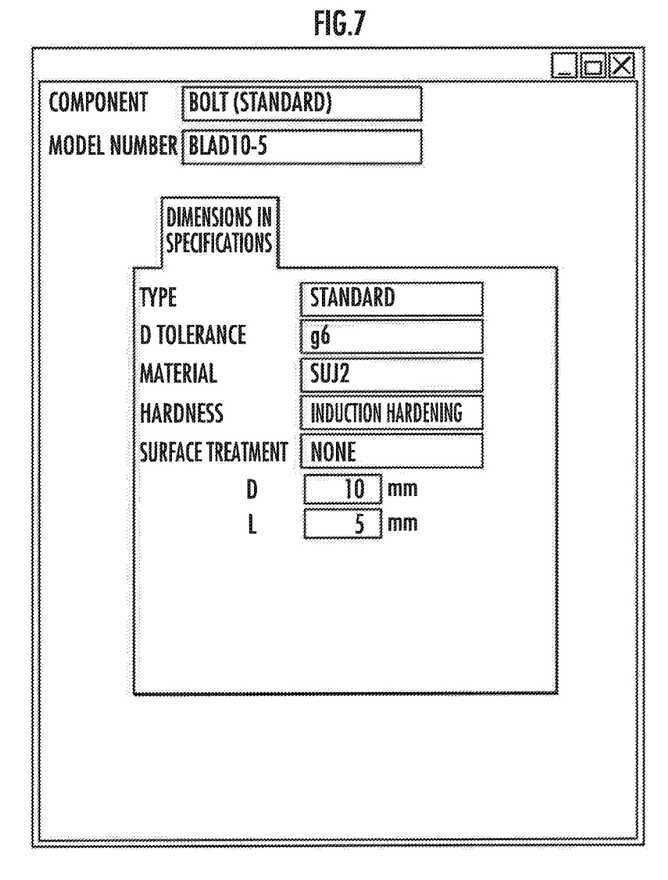
FIG. 7 is a descriptive diagram illustrating yet another example in which the standard component data are displayed on the screen.

FIG. 7 is a diagram illustrating an example in which a standard component associated with "bolt (standard)" is displayed. In FIG. 7, a model number, a material, surface treatment, a male screw length D, and a male screw diameter L are registered as registration items of the standard component. Since the shape of a bolt head is defined as a standard type according to the male screw diameter L, there is no parameter to define the shape of the bolt head.

Note that the parameters of the standard component data and the semi-standard component data illustrated in FIG. 3 and FIG. 5 to FIG. 7 are just examples, and all pieces of data listed in a catalog may be set as parameters in practice.

The standard component searching unit 18 searches for whether a component modified by the design product data input unit 14 exists among standard components (including semi-standard components; the same applies hereinafter) represented by the standard component data (including the semi-standard component data; the same applies hereinafter) stored in the standard component data memory unit 17. In this case, the standard component searching unit 18 searches for whether there is a component having parameters that match all the parameters of the standard component data, i.e., all pieces of data represented by the standard component data such as the dimensions, the material, the surface treatment, and the like.

When it is found from the search results by the standard component searching unit 18 that the modified component does not exist among the standard components, the alert unit 19 causes the display device 120 such as the display to display that effect. For example, a modified portion is displayed in a more eye-catching color than that of the others such as in red, or the modified portion is highlighted. The alert unit 19 may also cause the alert device 160 such as a speaker device to give a warning tone.

Further, when it is found from the search results by the standard component searching unit 18 that the modified component does not exist among the standard components, component data related to the component before the modification and stored in the design product data memory unit 12 are replaced with component data in which only modified data such as dimensions are modified.

When it is found from the search results by the standard component searching unit 18 that the modified component exists among the standard components, the component data related to the component before the modification and stored in the design product data memory unit 12 are replaced with standard component data related to a standard component corresponding to the modified component.

FIG. 4 is a diagram illustrating an example of a screen 30 on which a design product is displayed by the design product data display unit 15. This screen 30 is displayed by the design product data display unit 15, and on the screen 30, an image of a design product is displayed in a main display area 31 and hierarchized file names are displayed in a file name display area 32.

An image in which component data related to any component is displayed (see FIG. 3 and FIG. 5 to FIG. 7) may also be displayed on the screen 30 as needed. The list (see FIG. 2) created by the list creation unit 13 may further be displayed on the screen 30. Further, the list created by the list creation unit 13 may be output from the output device 130.

Figure 8:
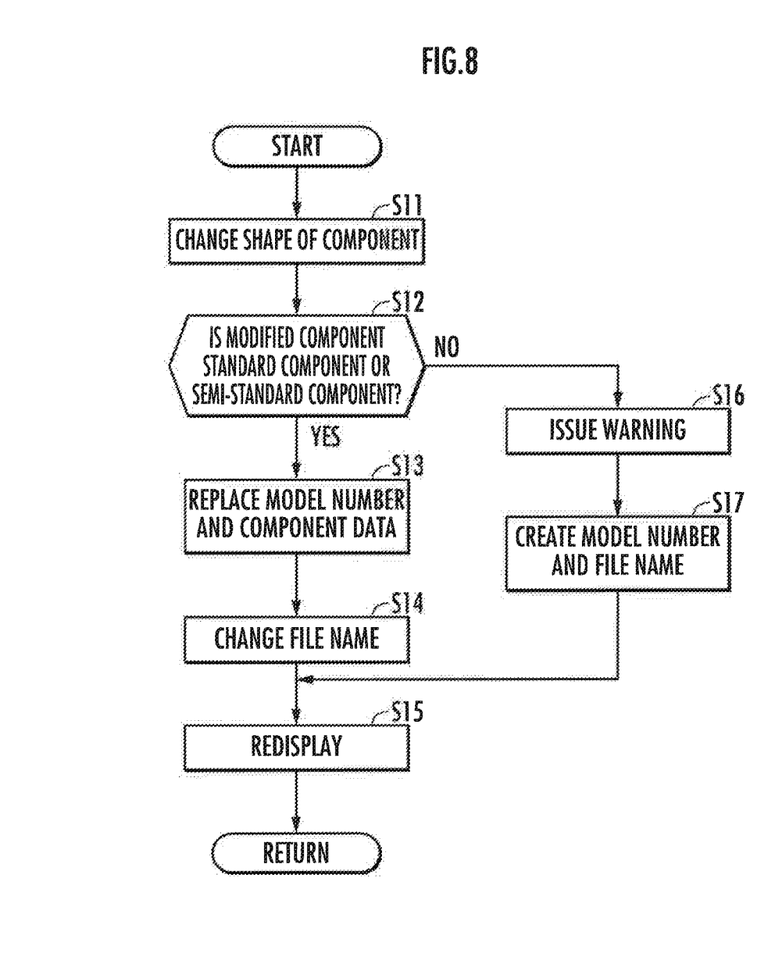
FIG. 8 is a flowchart illustrating processing of a first example performed on the computer by the method according to the embodiment of the present invention.

A first example of a processing procedure to be processed by the above-mentioned CAD system will be described below with reference to a flowchart of FIG. 8 by taking, as an example, a design product made up of two plates coupled through four shafts and fixed by four bolts.

Note that this flow illustrates processing after a designer completes three-dimensional design product data using a CAD system and the design product data display unit 15 displays, on the display or the like, shape data of a design product represented by the design product data. A step in which the design product data display unit 15 displays the shape data corresponds to a display step of the present invention.

The designer performs processing to use the design product data input unit 14 to modify the shape of any component in the design product created using the CAD system (S11). Here, suppose that processing to change the shaft length L of any one shaft of the four shafts from 100 mm to 80 mm is performed using the CAD system.

As illustrated in FIG. 3, the model number of each shaft is identified from data in product specifications, such as data indicative of the type, the material, the D tolerance, the hardness, and the surface treatment, in addition to data indicative of dimensions such as the shaft diameter D, the shaft length L, and the screw part length F.

Since the four shafts are identical, that is, the file names and model numbers of these shafts are identical, data indicative of the shaft lengths L of the four shafts are all changed from 100 mm to 80 mm. A step of accepting an instruction to change the dimensions of the component through the design product data input unit 14 corresponds to an acceptance step of the present invention.

The standard component searching unit 18 searches for whether the modified shaft is stored as a standard component in the standard component data memory unit (S12). In this case, a search is first performed to identify a product type from data used to identify the product type such as the type, the material, the D tolerance, the hardness, and the surface treatment. Then, a search is performed as to whether data indicative of the shaft length L in the identified product type ("SFAD" in FIG. 3) is any piece of data in the model number (for example, the second data in the model number in FIG. 3), and whether a standard component with the data indicative of 80 mm is stored in the standard component data memory unit. A step of searching by the standard component searching unit 18 corresponds to a search step of the present invention.

Note that the shaft length L may be changed through the design product data input unit 14 from 100 mm to 80 mm in a field in which shaft component data are displayed. A step of accepting an instruction to change the dimension of a component through the design product data input unit 14 also corresponds to the acceptance step of the present invention.

In this case, the standard component searching unit 18 searches for whether the modified shaft is stored as a standard component in the standard component data memory unit in the same manner as described above (S12). However, in this case, only the data indicative of the shaft length L is changed without changing the product type ("SFAD" in FIG. 3). Therefore, a search may be performed as to whether a standard component having data indicative of a shaft length L of 80 mm but the other pieces of data being the same as the data on the shaft before the modification is stored in an area of the standard component data memory unit, in which standard components of the same product type are stored. A step of searching by the standard component searching unit 18 in this way also corresponds to the search step of the present invention.

When the modified shaft is stored as a standard component in the standard component data memory unit (YES in S12), the design product data creating unit 11 not only replaces the component data with shape data with the shaft length L changed, but also stores, in the design product data memory unit 12, component data in which the model number and file name of the shaft before the modification is replaced with the model number and file name of the modified shaft (S13). A step of replacing the model number of this component corresponds to a model number replacing step of the present invention.

Note that the file name of a component may be a model number or a file name including part of the model number, or may be a file name uniquely given by any method. Further, since part of the components that constitute a design product is modified, the design product data creating unit 11 also changes the file name related to the modified design product and stores the changed file name in the design product data memory unit 12 (S14). In this regard, however, only a version of the file name may be changed.

Then, the design product data display unit 15 causes the display device 120 to display shape data on the design product after the component is modified (S15). A step of redisplaying design product data after the component is modified corresponds to a redisplay step of the present invention.

When the shaft length L is changed from 100 mm to 98 mm, the data may be stored in the standard component data memory unit 17 as a semi-standard component though not as a standard component. Even in such a case, the design product data creating unit 11 replaces the model number and file name of the shaft before the modification with the model number and file name of the semi-standard component, and stores the replaced model number and file name in the design product data memory unit 12 (S13).

The semi-standard component may vary in price, delivery date, and the like according to the dimension of the shaft length L. Therefore, it is preferred to prestore, in the standard component data memory unit 17, a calculation formula or the like using the shaft length L as a parameter in order to obtain semi-standard component data by setting the price, delivery date, and the like of the modified shaft as the calculation results. In this case, the price of the modified component can be presented automatically to the designer. A step of calculating the price of this modified component corresponds to a price calculation step of the present invention.

On the other hand, when the shaft length L is changed from 100 mm to 1000 mm, the modified shaft may not be stored in the standard component data memory unit 17 as neither a standard component nor a semi-standard component (NO in S12).

In this case, since the designer is likely to make a mistake, the alert unit 19 causes the display device 120 or the alert device 160 to issue such a warning that the modified shaft will correspond to neither a standard component nor a semi-standard component in order to call designer's attention (S16). A step of issuing the warning by the alert unit 19 corresponds to an alert step of the present invention.

Since the model number based on the model and the file name based on the model number are not automatically determined for the modified component, a model number and a file name changed from those before the change are created by any method, and these are stored in the design product data memory unit 12 (S17).

Then, the design product data display unit 15 causes the display device 120 to display the shape data on the design product after the component is modified (S15).

As described above, according to the first example, when the modified component is a standard component (YES in S12), or when the dimensions of the modified component fall within a range of dimensions of semi-standard components (YES in S12), the model number of the modified component is automatically replaced with a model number of the standard component (S13). Thus, the designer is not required to check whether the modified component is a standard component or a semi-standard component, and check on the model number and the like of the modified component, and this can simplify the design work.

As for a component manufacturer, the risk of being unable to receive an order for a component, for which the order is expected to be received as a standard component listed in a catalog at first, due to the design change of the component can be reduced. Further, when creating a list after a component is modified, the list creation unit 13 can automatically create a list in which the model number of the component is replaced with a changed model number.

Further, when a component is modified, a file name related to the component is automatically changed (S17), and this can prevent a confusion between file names before and after the modification.

On the other hand, when the modified component is not a standard component (NO in S12), a warning is issued on the display device 120 or from the alert device 160 (S16), and this can urge the designer to adopt a standard component which is generally inexpensive and the delivery date of which is earlier.

Figure 9:
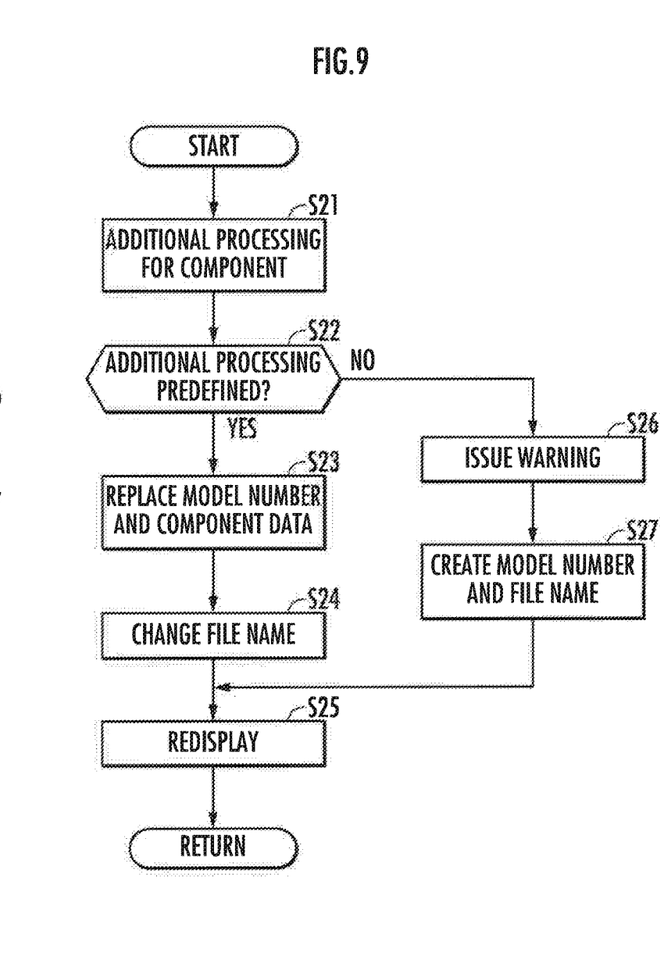
FIG. 9 is a flowchart illustrating processing of a second example performed on the computer by the method according to the embodiment of the present invention.

A second example of a processing procedure to be processed by the above-mentioned CAD system will be described below with reference to a flowchart of FIG. 9 by taking the same design product as an example.

The designer performs processing to use the design product data input unit 14 to modify the shape of any component in the design product created using the CAD system (S21). Here, suppose that additional processing to notch any one of the four shafts is performed using the CAD system.

In this case, since the four shafts are identical, that is, the file names and model numbers of these shafts are identical, the notch is added to all the four shafts. When the notch is added to only one shaft, there is a need to make the file name given to the shaft different from the file name given to the other shafts. The component obtained by performing the additional processing on the standard component is no longer the standard component. However, if the additional processing is predefined, the component can be a semi-standard component.

Therefore, a search is performed as to whether the notch added to the shaft is stored in the standard component data memory unit 17 as the additional processing predefined for the standard component (S22). In this case, a search is performed as to whether a standard component having data indicative of the additional processing corresponding to data indicative of predetermined dimensions of the notch, and other data being the same as the data on the shaft before the modification is stored in the standard component data memory unit.

When the notch added to the shaft is stored in the standard component data memory unit 17 as additional processing predefined for the standard component (YES in S22), the design product data creating unit 11 not only replaces the component data with shape data in which the notch is added, but also stores, in the design product data memory unit 12, component data in which the model number and file name of the shaft before the modification is replaced with the model number and file name of the modified shaft (S23).

Then, like in the first example mentioned above, the design product data creating unit 11 also changes the file names related to the modified design product and the component, and stores them in the design product data memory unit 12 (S24). Then, the design product data display unit 15 causes the display device 120 to display shape data on the design product after the component is subjected to the additional processing (S25).

On the other hand, when the shape after the shaft is subjected to the additional processing is not stored in the standard component data memory unit 17 as the additional processing predefined for the standard component (NO in S22), the alert unit 19 causes the display device 120 or the alert device 160 to issue such a warning that the modified shaft will not correspond to any semi-standard component in order to call designer's attention (S26).

Then, like in the first example mentioned above, the model number and file name of the modified component are created and stored in the design product data memory unit 12 (S27), and the design product data display unit 15 causes the display device 120 to display shape data on the design product after the component is subjected to the additional processing (S25).

As described above, according to the second example, when the shape of the modified component matches the shape of a semi-standard component (YES in S22), the model number of the modified component is automatically replaced with a model number related to the standard component or the semi-standard component (S23). Thus, the designer is not required to check whether the modified component is a standard component or a semi-standard component, and check on the model number and the like of the modified component, and this can simplify the design work.

Further, when the dimensions of the modified component are not determined to be the dimensions of a semi-standard component (NO in S22), a warning is issued from the display device 120 or the alert device 160 (S26), and this can make the designer become aware of the need to modify the shape of the component into a semi-standard component.

Figure 10:
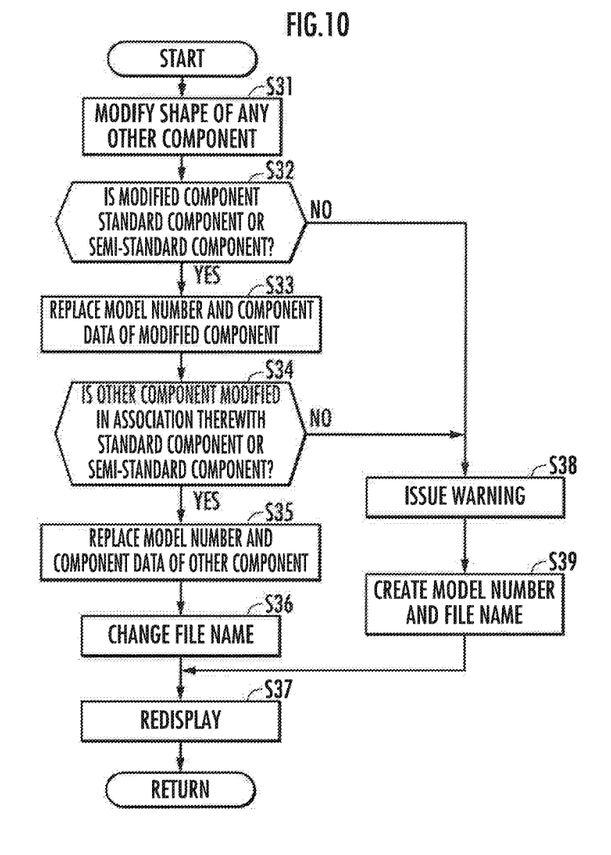
FIG. 10 is a flowchart illustrating processing of a third example performed on the computer by the method according to the embodiment of the present invention.

A third example of a processing procedure to be processed by the above-mentioned CAD system will be described below with reference to a flowchart of FIG. 10 by taking the same design product as an example.

The designer performs processing to use the design product data input unit 14 to modify the shape of any one of components in the design product created using the CAD system (S31). Here, suppose that the processing to change the female screw diameter N of any one of the four shafts from 5 mm to 4 mm is performed using the CAD system. Note that the female screw diameter N may be changed from 5 mm to 4 mm in a field in which shaft component data are displayed by the design product data input unit 14.

In this case, since the four shafts are identical, that is, the file names and model numbers of these shafts are identical, the female screw diameters N of the four shafts are all changed from 5 mm to 4 mm.

A search is performed as to whether the modified shaft is stored as a standard component in the standard component data memory unit 17 (S32). In this case, a search is performed as to whether a standard component having data indicative of a female screw diameter N of 5 mm and other data being the same as the data on the shaft before the modification is stored in the standard component data memory unit. When the modified shaft is stored as the standard component in the standard component data memory unit 17 (YES in S32), the design product data creating unit 11 not only replaces the component data with shape data in which the female screw diameter N is changed, but also stores, in the design product data memory unit 12, component data in which the model number and file name of the shaft before the modification is replaced with the model number and file name of the modified shaft (S33).

Further, since the female screw diameter N of the shaft is changed from 5 mm to 4 mm, the male screw diameter L of a bolt screwed together with the female screw of the shaft needs to be changed from 5 mm to 4 mm.

Therefore, a search is performed as to whether the modified bolt is stored in the standard component data memory unit 17 as a standard component or a semi-standard component (S34).

When the modified bolt is stored in the standard component data memory unit as a standard component or a semi-standard component (YES in S34), the design product data creating unit 11 not only replaces the component data with shape data in which the male screw diameter L is changed, but also stores, in the design product data memory unit 12, component data in which the model number and file name of the bolt before the modification is replaced with the model number and file name of the modified bolt (S35).

Further, since part of the components that constitute the design product are modified, the design product data creating unit 11 also changes the file name related to the design product and stores the changed file name in the design product data memory unit 12 (S36). In this regard, however, only a version of the file name may be changed.

After that, the design product data display unit 15 causes the display device 120 such as the display to display shape data on the design product including the modified shaft and the bolt modified in association therewith (S37).

On the other hand, when the modified shaft or bolt is not stored in the standard component data memory unit 17 as a standard component or a semi-standard component (NO in S32 or NO in S34), the alert unit 19 causes the display device 120 or the alert device 160 to issue a warning in order to call designer's attention (S38).

Then, like in the first example mentioned above, the model numbers and file names of the modified component and the component modified in association therewith are created and stored in the design product data memory unit 12 (S39), and the design product data display unit 15 causes the display device 120 to display design product data after these components are modified (S38).

Figure 11:
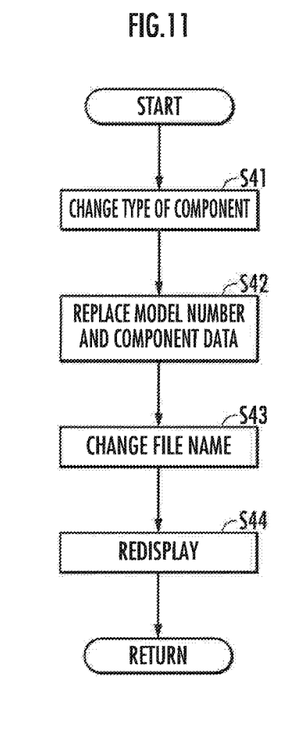
FIG. 11 is a flowchart illustrating processing of a fourth example performed on the computer by the method according to the embodiment of the present invention.

A fourth example of a processing procedure to be processed by the above-mentioned CAD system will be described below with reference to a flowchart of FIG. 11 by taking the same design product as an example.

The designer performs processing to use the design product data input unit 14 to change any one of components in the design product created using the CAD system to another component of a similar type (S41). Here, the design product data input unit 14 accepts an instruction to change a bolt to another type of bolt in a field in which bolt component data are displayed.

Since there are a wide variety of bolts even though the male screw length L and the male screw diameter D are the same, the designer selects an appropriate type of bolt in consideration of the intended use and the like.

In the standard component data memory unit 17, data on standard components and semi-standard components are stored hierarchically according to the component types such as shaft, bolt, and nut. Then, predefined dimensions are given to all the standard components and semi-standard components as parameters for each type of component. For example, the male screw length L and the male screw diameter D are given to all types of bolts as parameters. If these parameters are the same, different types of components can also be replaced.

Therefore, when a bolt before change is changed to a type of bolt stored in the standard component data memory unit 17 as a standard component or a semi-standard component, the design product data creating unit 11 can not only replace component data with shape data on the changed type of bolt, but also store, in the design product data memory unit 12, component data in which the model number and the file name before the change are replaced with the model number and the file name of the changed bolt (S42). A step in which the design product data creating unit 11 replaces the type of component corresponds to a related component changing step of the present invention.

Then, like in the first example mentioned above, the file names of the modified design product and component are created and stored in the design product data memory unit 12 (S43).

The design product data display unit 15 causes the display device 120 to display design product data replaced to fit the changed bolt stored in the design product data memory unit 12 to the parameters of the bolt before the change (S44).

As described above, according to the fourth example, the changed component can be placed in the position of the component before the change.

While the embodiment of the present invention has been described with reference to the accompanying drawings, the present invention is not limited to the embodiment.

DESCRIPTION OF REFERENCE NUMERALS

11 . . . design product data creating unit, 12 . . . design product data memory unit, 13 . . . list creation unit, 14 . . . design product data input unit, 15 . . . design product data display unit, 16 . . . component data display unit, 17 . . . standard component data memory unit, 18 . . . standard component searching unit, 19 . . . alert unit, 20 . . . screen, 21 . . . main display area, 22 . . . file name display area, 100 . . . computer, 110 . . . input device, 120 . . . display device, 130 . . . output device, 140 . . . communication device 150 . . . memory device, 160 . . . alert device.

The invention claimed is:

1. A method of causing a display device to display a shape of a component based on component data on a computer including the display device and an input device, comprising:
   an acceptance step of accepting an instruction to modify a component from the input device;
   a search step of searching for whether a modified component after the modification in accordance with the accepted instruction is stored in a standard component data memory unit in which data on a plurality of standard components each including at least dimensions that define the shape and a model number are prestored;
   a model number replacing step in which, in a case where the modified component after the modification is searched in the search step to be stored in the standard component data memory unit, the model number of the component before the modification is replaced with the model number related to the standard component;
   a redisplay step of displaying, on the display device, the shape of the component based on shape data of the modified component on which the instruction is accepted; and
   an alert step of issuing a warning in the case where the modified component is searched in the search step not to be stored in the standard component data memory unit,
   wherein a range of dimensions related to at least one of the dimensions that define shape data of the component is included in the standard component data memory unit, and
   in the case where a modified dimension of the component is searched in the search step to be within the range of dimensions, the model number of the component before the modification is replaced with a model number corresponding to the modified dimension in the model number replacing step.

2. The method according to claim 1, wherein the instruction to modify the component includes an instruction to modify at least one of the dimensions that define shape data of the component.

3. The method according to claim 1, wherein
   in the case where the modified dimension of the component is searched in the search step to be out of the range of dimensions, the warning is issued in the alert step.

4. The method according to claim 1, wherein the instruction to modify the component includes an instruction to modify shape data of the component.

5. The method according to claim 1, wherein the instruction to modify the component includes an instruction to modify at least any piece of data in the data on the component.

6. The method according to claim 1, further comprising:
   a price calculation step of calculating a price of the modified component according to a length of the modified dimension in the case where the modified dimension of the component is searched in the search step to be within the range of dimensions; and
   a price display step of causing the display device to display the price calculated in the price calculation step.

7. The method according to claim 1, wherein a delivery date or a price of the component is included in the data.

8. The method according to claim 1, wherein the instruction to modify the component includes an instruction to modify a shape of at least one portion of the component.

9. The method according to claim 8, wherein
   data on a semi-standard component in which the shape of at least one portion of the component is modified are prestored in the standard component data memory unit, and
   in the case where the modified shape of the component after the modification is searched in the search step to match with that of a semi-standard component, the model number of the component before the modification is replaced in the model number replacing step with a model number generated according to the semi-standard component after the modification.

10. The method according to claim 8, wherein in the case where the modified shape of the component after the modification is searched in the search step to match with that of the standard component, the model number of the component before the modification is replaced in the model number replacing step with a model number related to the standard component after the modification.

11. The method according to claim 1, further comprising
   a list creation step of creating a list including at least the model number of the displayed component,
   wherein in the case where the model number is replaced in the model number replacing step with the model number after the modification, a list in which the model number is replaced with the model number after the modification is created in the list creation step.

12. The method according to claim 1, further comprising a file name changing step in which, in the case where the model number of the component is replaced in the model number replacing step, a file name related to data including the shape data and model number of the component is changed.

13. The method according to claim 1, wherein the instruction to modify the component includes an instruction to change the model number.

14. The method according to claim 10, wherein
data on dimensions that define dimensions of a shape of the standard component are included in data on the standard component stored in the standard component data memory unit, and
in the case where the modified shape of the component is searched in the search step to match with that of the standard component, the standard component after the modification is displayed in the redisplay step to match dimensions of the standard component to the basic dimensions of the standard component before the modification.

15. The method according to claim 1, further comprising
a related component changing step in which, in the case where the instruction to modify the component is accepted from the input device in the acceptance step, shape data of the component is changed to shape data of another component related to the component on which the instruction to modify is accepted,
wherein a shape based on the shape data of the component changed in the related component changing step is also redisplayed in the redisplay step.

16. A program causing a computer including a display device and an input device to execute:
an acceptance step of accepting an instruction to modify a component from the input device;
a search step of searching for whether a modified component on which the instruction is accepted is stored in a standard component data memory unit in which data on a plurality of standard components each including at least dimensions that define the shape and a model number are prestored;
a model number replacing step in which, in the case where the modified component is searched in the search step to be stored in the standard component data memory unit, the model number of the component before the modification is replaced with the model number related to the standard component;
a redisplay step of displaying, on the display device, the shape of the component based on shape data of the modified component on which the instruction is accepted; and
an alert step of issuing a warning in the case where the modified component is searched in the search step not to be stored in the standard component data memory unit,
wherein a range of dimensions related to at least one of the dimensions that define shape data of the component is included in the standard component data memory unit, and
in the case where a modified dimension of the component is searched in the search step to be within the range of dimensions, the model number of the component before the modification is replaced with a model number corresponding to the modified dimension in the model number replacing step.

* * * * *